United States Patent [19]

Naruse et al.

[11] 4,188,301
[45] Feb. 12, 1980

[54] MAGNETIC RECORDING COMPOSITION

[75] Inventors: Tunehide Naruse; Yasushi Sasaki; Yukio Matsumoto, all of Yokohama, Japan

[73] Assignee: Victor Company of Japan, Limited, Yokohama, Japan

[21] Appl. No.: 22,048

[22] Filed: Mar. 19, 1979

[30] Foreign Application Priority Data

Mar. 20, 1978 [JP] Japan .................................. 53/31017

[51] Int. Cl.² .......................... H01F 1/00; G11B 5/70; G11B 5/78
[52] U.S. Cl. ................................................. 252/62.54
[58] Field of Search ........................... 252/62.53, 62.54

[56] References Cited

U.S. PATENT DOCUMENTS

| 3,274,111 | 9/1966 | Sada et al. .......................... 252/62.54 |
| 3,676,217 | 7/1972 | Akashi et al. ................. 252/62.54 X |
| 3,704,152 | 11/1972 | Hartman et al. .............. 252/62.54 X |
| 4,020,236 | 4/1977 | Aonuma et al. ...................... 428/457 |

FOREIGN PATENT DOCUMENTS 1009774  11/1965  United Kingdom .................. 252/62.54

Primary Examiner—F. C. Edmundson
Attorney, Agent, or Firm—Lowe, King, Price & Becker

[57] ABSTRACT

A magnetic recording composition which comprises a magnetic powder, a resinous binder, and triolein or a mixture of triolein and hexyl laurate as a lubricant. When used singly, triolein is used in an amount of 0.5 to 10 wt % of the binder. When used in combination, on the other hand, the total amount is in the range of up to 20 wt % of the binder while using the triolein in the range of 0.5 to 15 wt. % of the binder.

4 Claims, No Drawings

MAGNETIC RECORDING COMPOSITION

This invention relates to the magnetic recording art and more particularly, to a magnetic recording composition comprising a specific type of lubricant.

As is well known in the art, magnetic recording compositions which are used to make magnetic recording media such as magnetic recording tapes, sheets and discs are required, when applied as a magnetic layer of such medium, to show not only excellent magnetic and electric characteristics, but also other desirable properties or tendencies such as small abrasion resistance, still picture characteristics and low tendency to wear out a head of a recording and reproducing device. To this end, a number of lubricants are used and incorporated in the magnetic recording composition. For example, there have been practically used, as lubricant, esters of fatty acids such as propyl stearate, amyl stearate and stearyl butyrate, natural oils and fats, various fatty acids, and other solid lubricants. However, these known lubricants employed for the magnetic recording purpose have disadvantages which follow. The natural oils and fats in most cases contain impurities which will give an adverse influence of lubrication on the magnetic layer of a final magnetic article, coupled with another disadvantage that such oils and fats have to be used in large amounts since they contain relatively small contents of effective lubricant components. Accordingly, the magnetic layer formed from the magnetic composition using those oils and fats disadvantageously assumes an adhesive tendency, leading to clogging of the recording and reproducing heads.

Conventionally employed fatty acids and their esters drawbacks of blooming, exudation and unstability in oxidation. Further, solid lubricants such as molybdenum disulfate, graphite and the like are disadvantageous in that they serve to lower the packing density of magnetic powder and thus can not be added in large amounts, and are apt to cause clogging of the head.

It is accordingly an object of the present invention to provide a magnetic recording composition which uses a specific type of lubricant.

It is another object of the present invention to provide a magnetic composition capable of forming a magnetic layer which is remarkably improved in abrasion resistance and still picture characteristics and has a reduced tendency to wear out recording and reproducing heads.

It is a further object of the invention to provide a magnetic recording composition which can yield a magnetic layer causing little or no problem of head clogging.

According to the present invention, there is provided a magnetic recording composition which comprises 65 to 90 wt % of a magnetic powder, correspondingly 35 to 10 wt % of a resinous binder, and triolein as a lubricant contained in an amount of 0.5 to 10 wt % of of the binder.

Triolein has been found to be very effective in improving the still picture characteristics and abrasion resistance and also in reducing the head clogging and wearing-out tendencies of a magnetic layer formed from the composition, and is generally used in the amount defined above. In order to further improve these properties and tendencies, the composition can comprise hexyl laurate in addition to triolein as lubricant. In this case, the mixture of triolein and hexyl laurate is generally used in an amount of up to 20 wt % of the binder but triolein is usable in this case in an amount of 0.5 to 15 wt % of the binder.

The present invention will be described in detail.

The magnetic materials or powders useful for the purpose of the invention may be any of conventionally employed ones for the magnetic recording purpose which include, for example, $\gamma$-$Fe_2O_3$, Co-$\gamma$-$Fe_2O_3$, Co-$Fe_3O_4$ and the like.

The useful resinous binders are, for example, known two-component systems including a polyisocyanate as one component and, as the other component, resins or elastomers having functional groups reactive with the polyisocyanate such as polyvinyl alcohol-containing vinyl chloride-vinyl acetate copolymer, polyurethane elastomer, polyester, polyol, phenoxy resin and the like. Further, vinyl chloride-vinyl acetate copolymer which is not reactive with the polyisocyanate is preferably used in combination with polyisocyanate or an elastomer or resin such as a thermoplastic saturated polyester resin or nitrile rubber. Examples of the polyisocyanate are reaction products of 3 moles of 2,4-tolylenediisocyanate and 1 mole of trimethylolpropane(available under the name of Coronate L from Nippon Polyurethane Co., Ltd.), 2,4-tolylenediisocyanate, 2,6-tolylenediisocyanate, hexamethylenediisocyanate, a reaction product of 3 moles of hexamethylenediisocyanate and 1 mole of trimethylolpropane, and the like.

The binder and the magnetic powder are used in such amounts as defined hereinbefore and the mixing ratio of these components is well known and is not further described herein.

A prominent feature of the present invention resides in the fact that the composition comprises, as a lubricant, triolein or a mixture of triolein and hexyl laurate.

When the triolein is used singly, the amount is in the range of 0.5 to 10 wt % based on the binder. Less amounts are unfavorable since the magnetic layer does not show any satisfactory improved properties and tendencies. On the other hand, larger amounts will cause undesirable lowering of reproduction output level, adhesiveness, and head-clogging tendency.

As described hereinbefore, the addition of hexyl laurate to triolein can further improve such properties and tendencies of the magnetic layer as indicated. The mixture is used in a total amount ranging up to 20 wt % of the binder, in which case the triolein can be used in the amount of 0.5 to 15 wt % of the binder. The extent to which the magnetic medium is improved by the addition or mixing will be understood from the examples and comparative examples appearing hereinlater.

In practical application, the magnetic recording composition is prepared by mixing the magnetic powder, binder and lubricant in an organic solvent by a suitable means such as a sand mill, and then applied onto a sheetlike substrate. The applied sheet is surface calendered or treated by other known techniques to obtain a magnetic medium. As an example of the organic solvent, there is suitably used a mixed solvent of methyl ethyl ketone, methyl isobutyl ketone and toluene though other known solvent systems may be likewise used.

As a matter of course, other additives such as a dispersant, crosslinking agent and so on ordinarily employed for the magnetic recording media may be added to the composition.

The present invention will be particularly described by way of the following examples, which should not be construed as limiting the invention thereto. Comparative examples are also provided to facilitate the better understanding of excellency of a invention.

EXAMPLE 1

| | |
|---|---|
| $\gamma\text{-}Fe_2O_3$ | 100 parts by weight |
| Binder for magnetic recording composed of a mixture of vinyl chloride-vinyl acetate copolymer and polyurethane elastomer | 20 parts by weight |
| Dispersant of soybean lecithin | 1 part by weight |
| Mixed solvent of methyl ethyl ketone, methyl isobutyl ketone and toluene in equal amounts | 250 parts by weight |
| Triolein | different amounts below 3 parts by weight |

Compositions of the above formulations using different amounts of triolein within and outside the range defined hereinbefore were prepared by mixing and dispersing in a suitable means such as a sand mill. Each composition was applied onto a 21μ thick polyester film substrate and then surface-calendered. This film was then slit into ¾ inch wide reeled tapes for magnetic video recording. Thereafter, the tape was set in a video magnetic recorder and reproducing device and reproduced in a still picture or frozen picture state for 60 minutes to measure a lowering of the reproduction output level. The test results are shown in Table 1.

The magnetic tape obtained from the composition using 2 parts by weight of triolein (i.e. 10 wt % based on the binder) was found to show a slight degree of exudation of the lubricant on the magnetic layer. The tape from the composition using no triolein was found to have streaks on its surface caused during the recording and reproducing operation by sliding contact with the head. Further, the tape obtained from the composition using 3 parts by weight (15 wt % based on the binder) of triolein was found to show a heavy degree of exudation and to be sticky.

COMPARATIVE EXAMPLE 1

Example 1 was repeated using, instead of triolein as a lubricant, 1 part by weight by diolein thereby obtaining a magnetic video tape. When the still picture characteristics of the tape were measured in the same manner as in Example 1, the reproduction output level was found to be lowered by −7.5 dB.

COMPARATIVE EXAMPLE 2

Example 1 was repeated using, instead of triolein, 1 part by weight of tristearin thereby obtaining a magnetic video tape. The still picture characteristics of the tape were measured in the same manner as in Example 1. As a result, it was found that this tape using tristearin was bloomed to a considerable extent on the surface thereof and was lowered in output to −20 dB only 5 minutes after commencement of the still picture reproduction. This is because the head clogging took place due to the blooming of the lubricant.

EXAMPLE 2

| | |
|---|---|
| $Co\text{-}Fe_3O_4$ | 100 parts by weight |
| Binder for magnetic recording composed of a mixture of vinyl chloride-vinyl acetate copolymer and nitrile rubber | 20 parts by weight |
| Dispersant of soybean lecithin | 1 part by weight |
| Mixed solvent of methyl ethyl ketone, methyl isobutyl ketone and toluene | 250 parts by weight |
| Triolein | different amounts below 3 parts by weight |

The compositions of the above formulations using different amounts of triolein were prepared and used for making magnetic video tapes in the same manner as in Example 1. These tapes were each subjected to a still picture reproduction operation to measure a lowering of the reproduction output level, with the results shown in Table 1. It was found that the tape obtained from the composition using 3 parts by weight (15 wt % based on the binder) of triolein (i.e. 15 wt % based on the binder) showed a degree of exudation and was rather sticky, causing the head clogging.

EXAMPLE 3

| | |
|---|---|
| $Co\text{-}\gamma\text{-}Fe_2O_3$ | 100 parts by weight |
| Binder for magnetic recording composed of a mixture of vinyl chloride-vinyl acetate copolymer and thermoplastic saturated polyester resin | 20 parts by weight |
| Dispersant of soybean lecithin | 1 part by weight |
| Mixed solvent of methyl ethyl ketone, methyl isobutyl ketone and toluene | 250 parts by weight |
| Triolein | different amounts below 3 parts by weight |

The compositions of the above formulations were used to make magnetic video tapes similarly to the case of Example 1. These tapes were each subjected to a still picture reproduction to determine a lowering of the reproduction output level, with the results shown in Table 1. The tape obtained from the composition using 3 parts by weight (15 wt % based on the binder) of triolein was found to give a degree of exudation and to be rather sticky.

EXAMPLE 4

| | |
|---|---|
| $Co\text{-}Fe_3O_4$ | 100 parts by weight |
| Binder for magnetic recording composed of polyvinyl alcohol-containing vinyl chloride-vinyl acetate copolymer and polyurethane elastomer | 20 parts by weight |
| Crosslinking agent composed of polyisocyanate | 2 parts by weight |
| Dispersant of soybean lecithin | 1 part by weight |
| Mixed solvent of methyl ethyl ketone, methyl isobutyl ketone toluene | 250 parts by weight |
| triolein | different amount below 3 parts by weight |

The compositions of the above formulations were used to make magnetic video tapes in the same manner as in Example 1. These tapes were each subjected to the still picture reproduction to measure a lowering of the reproduction output level, with the results shown in Table 1. It was recognized that the tape formed from the composition using 3 parts by weight (15 wt % based on the binder) of triolein suffered from exudation.

Table 1

| amount of triolein parts by weight (% by weight based on binder) | 0 (0) | Within the Range of Invention | | | | Outside the Range of Invention |
|---|---|---|---|---|---|---|
| | | 0.1 (0.5%) | 1 (5%) | 1.6 (8%) | 2 (10%) | 3 (15%) |
| Lowering of reproduction output level of Tapes of Example 1 (dB) | −20 | −5.2 | −1.2 | −1.1 | −1.4 | −1.5 |
| Lowering of reproduction output level of Tapes of Example 2 (dB) | −20 | −5.2 | −2.0 | — | −2.2 | — |
| Lowering of reproduction output level of Tapes of Example 3 (dB) | −20 | −4.8 | −1.5 | — | −1.2 | — |
| Lowering of reproduction output level of Tapes of Example 4 (dB) | −12 | −4.2 | −0.8 | — | −1.2 | — |

From the above Table, it will be seen that good still picture characteristics can be obtained when triolein is used in an amount of 0.5 to 10 wt % of the binder.

Further, when the magnetic video recording tapes of Example 1 and Comparative Examples 1 and 2 were continuously run in a still picture state for 100 hours, respectively, to measure the wearing amount of the head, it was found that the tapes of Example 1 showed head-wearing amounts ⅜–1/6 times as small as those of comparative Examples 1 and 2.

EXAMPLE 5

| | |
|---|---|
| Co-$Fe_3O_4$ | 100 parts by weight |
| Binder for magnetic recording composed of a mixture of vinyl chloride-vinyl acetate copolymer and nitrile rubber | 20 parts by weight |
| Dispersant of soybean lecithin | 1 part by weight |
| Mixed solvent of methyl ethyl ketone, methyl isobutyl ketone and toluene | 250 parts by weight |
| Mixture of triolein and hexyl laurate | different amounts below 5 parts by weight in total |

The compositions of the above formulations were each used to make a magnetic video tape. The still picture characteristics of the tapes obtained in the same manner as in Example 1 are shown in Table 2 below.

lent in the case where the mixture of triolein and hexyl laurate is used than in the case using triolein alone.

The use of the mixed lubricant was found to be effective in suppressing the head clogging tendency and to make the coefficient of kinetic friction small. Even when triolein was used in relatively large amounts, the characteristic properties of the final tape were not so deteriorated by addition of hexyl laurate.

Further, when hexyl laurate was used singly as the lubricant, the stick-slip phenomenon took place, causing the picture to fluctuate. However, any such phenomenon did not occur in the case of the mixed lubricant of hexyl laurate and triolein.

From the foregoing, it will be understood that the mixture of triolein and hexyl laurate is more excellent as lubricant than triolein alone.

What is claimed is:

1. A magnetic recording composition comprising 65 to 90 wt % of a magnetic powder, corresponding by 35 to 10 wt % of a resinous binder, and triolein as a lubricant contained in an amount of 0.5 to 10 wt % of the binder.

2. A magnetic recording composition according to claim 1, wherein the lubricant is a mixture of triolein and hexyl laurate.

3. A magnetic recording composition according to claim 2, wherein the mixture is used, as a total, in an amount of up to 20 wt % of the binder and the triolein is used in an amount of 0.5 to 15 wt % of the binder.

4. A magnetic recording composition according to claim 1, wherein said resinous binder is composed of vinyl chloride-vinyl acetate copolymer and a member selected from a polyisocyanate, nitrile rubber and thermoplastic saturated polyester resin.

Table 2

| Parts by weight (% by weight based on the binder) | Within the range of Invention | | | | | Outside the range of Invention | | | |
|---|---|---|---|---|---|---|---|---|---|
| | T*:2 (10%) HL:0 (0%) | T:2 (10%) HL:2 (10%) | T:1 (5%) HL:1 (5%) | T:0.1 (0.5%) HL:0.1 (0.5%) | T:3 (15%) HL:1 (5%) | T:3 (18%) HL:1.6 (8%) | T:3.6 (18%) HL:1 (5%) | T:2 (10%) HL:3 (15%) | T:1 (5%) HL:4 (20%) |
| Lowering of reproduction output level (dB) | −2.2 | −1.6 | −1.2 | −4.7 | −3.5 | −20 | −20 | −2.8 | −3.2 |
| Adhesiveness | slight | no | no | no | slight | slight | yes | slight | yes |
| Head clogging tendency | no | no | no | no | no | yes | yes | no | no |

*Note:
T ..... triolein
HL ..... hexyl laurate

From the results shown in Tables 1 and 2, it will be seen that the still picture characteristics are more excel-